United States Patent
Takata et al.

(10) Patent No.: US 6,638,988 B2
(45) Date of Patent: Oct. 28, 2003

(54) POROUS FILM, SEPARATOR FOR CELL, AND CELL

(75) Inventors: Atsuhiro Takata, Ibaraki (JP); Takeshi Yamada, Takatsuki (JP); Ryuma Kuroda, Ibaraki (JP)

(73) Assignee: Sumitomo Chemical Company, Ltd., Osaka (JP)

( * ) Notice: Subject to any disclaimer, the term of this patent is extended or adjusted under 35 U.S.C. 154(b) by 129 days.

(21) Appl. No.: 09/983,201

(22) Filed: Oct. 23, 2001

(65) Prior Publication Data

US 2002/0148723 A1 Oct. 17, 2002

(30) Foreign Application Priority Data

Oct. 30, 2000 (JP) .......................................... 2000-330204
Apr. 9, 2001 (JP) .......................................... 2001-109657

(51) Int. Cl.⁷ .......................... B01D 39/00; B01D 39/14; D02F 1/06
(52) U.S. Cl. ............. 521/143; 210/500.27; 210/500.34; 210/500.42; 264/288.8; 264/289.6; 264/290.2; 264/235.8
(58) Field of Search ................................. 521/143, 146, 521/149; 210/500.27, 500.34, 500.42; 264/288.8, 289.6, 290.2, 235.8

(56) References Cited

U.S. PATENT DOCUMENTS 4,793,956 A * 12/1988 Nogiwa et al.
5,317,035 A * 5/1994 Jacoby et al.
5,650,451 A * 7/1997 Yagi et al.

* cited by examiner

*Primary Examiner*—Morton Foelak
(74) *Attorney, Agent, or Firm*—Sughrue Mion, PLLC

(57) ABSTRACT

A porous thermoplastic resin film capable of functioning well as a separator of a cell is provided. The porous film is constituted with a thermoplastic resin and a filler, wherein $X_R$ defined by the following formula:

$$X_R = 25 \times T_{GUR} \times d^2 / Y$$

is smaller than 5, where $Y(\mu m)$, $T_{GUR}$ (sec/100 cc), and d ($\mu m$) represent the thickness, the gurley value, and the average pore diameter of said film, respectively. The porous film constructed as shown above can reduce the internal resistance of a cell when used as a separator of the cell.

8 Claims, No Drawings

POROUS FILM, SEPARATOR FOR CELL, AND CELL

FIELD OF THE INVENTION

The present invention relates to a porous thermoplastic resin film suitable for use as a separator of a cell, and more particularly to a porous thermoplastic resin film suitably used as a separator of an electrolytic capacitor, a lithium cell, a fuel cell, a battery, or the like.

BACKGROUND OF THE INVENTION

Hitherto, as a porous thermoplastic resin film having air permeability, there is known, for example, a porous film obtained by stretching a thermoplastic resin film containing a filler. Such a porous film having air permeability has a good moisture permeability or airy property, and is used widely as a hygienic material such as a disposable diaper.

For example, Japanese Unexamined Patent Publication No. 09-176352 discloses a porous film obtained from a polypropylene composition composed of 100 parts by weight of polypropylene, 10 to 120 parts by weight of resin particles having an average particle diameter of 0.01 to 10 μm, and 0.01 to 3 parts by weight of a β-crystal type nucleating agent. The porous film disclosed above has a gurley value, which shows air permeability, of 10 to 30000 sec/100 cc, a porosity of 10 to 70%, and the maximum pore diameter of 0.1 to 9 μm. However, according to the studies made by the inventors of the present invention, the above porous film, when used as a separator in a cell, particularly a lithium cell, increases the internal resistance of the cell and is not sufficient as the separator.

An object of the present invention is to provide a porous thermoplastic resin film suitable for a separator of a cell.

SUMMARY OF THE INVENTION

The inventors of the present invention have made eager studies in order to develop a porous thermoplastic resin film that gives a low internal resistance when the film is used as a cell separator, and have found that a porous film comprises a thermoplastic resin and a filler and satisfies a particular relationship among the thickness, the gurley value, and the average pore diameter thereof functions well when used as a cell separator. Thus, the present invention has been completed.

The present invention provides a porous film comprising a thermoplastic resin and a filler, wherein $X_R$ defined by the following formula:

$$X_R = 25 \times T_{GUR} \times d^2 / Y$$

is smaller than 5, where Y (μm), $T_{GUR}$ (sec/100 cc), and d (μm) represent the thickness, the gurley value, and the average pore diameter of the film, respectively.

Further, the present invention provides a separator for a cell which separator is made of the said porous film, and a cell having the said separator.

According to the studies made by the inventors of the present invention, the porous polypropylene film disclosed in Japanese Unexamined Patent Publication No. 09-176352, for example, has the parameter $X_R$ as defined above of about 10 to 800; and the porous film increases the internal resistance of the cell when used as a separator of a cell. Thus the cell obtained from above porous film does not provide a sufficient performance. In contrast, the porous film provided by the present invention has a value $X_R$ of less than 5 and reduces the internal resistance of the cell, when the porous film provided by the present invention is used as a separator of a cell. Thus the cell containing the porous film of the present invention shows a high performance as a cell.

DETAILED DESCRIPTION OF THE INVENTION

In the porous film of the present invention, the value $X_R$ defined by the following formula:

$$X_R = 25 \times T_{GUR} \times d^2 / Y$$

is less than 5, preferably not more than 3, more preferably not more than 2, where Y (μm), $T_{GUR}$ (sec/100 cc), and d (μm) represent the thickness, the gurley value, and the average pore diameter of the porous film, respectively. A porous film having a value $X_R$ of 5 or more, when used as a separator, increases the internal resistance of the cell, and does not provide a cell functioning well.

The gurley value is represented by the period of time that is needed for a predetermined amount of air (typically 100 cc) to permeate through a predetermined area (typically 645.16 mm$^2$) of the film, and is measured according to JIS (Japanese Industrial Standard) P8117, as will be described later.

The average pore diameter d is typically measured by the bubble point method. The bubble point method is the method which includes a step of filling micro pores of a film with liquid and a step of squeezing the liquid from the micro pores by the force prevailing the surface tension of the liquid filling the micro pores. The average pore diameter d can be obtained according to ASTM F316-86 as will be described later.

Here, the gurley value $T_{GUR}$ and the average pore diameter d of the porous film of the present invention are not particularly limited as long as they are combined to give a parameter $X_R$ of smaller than 5; however, the gurley value $T_{GUR}$ is preferably within the range from 40 to 3000 sec/100 cc, more preferably within the range from 60 to 1000 sec/100 cc, and the average pore diameter d is preferably within the range from 0.04 to 0.4 μm, more preferably within the range from 0.04 to 0.2 μm.

The film thickness Y of the porous film of the present invention is typically from 1 to 200 μm, preferably from 5 to 50 μm, more preferably from 5 to 30 μm.

A combination giving a value $X_R$ of less than 5 may be obtained in the following manner. Typically, a predetermined film thickness Y μm is first set, and then the value $T_{GUR} \times d^2$ is determined in accordance with the value of Y so that the value $X_R$ will be less than 5. Since $T_{GUR}$ is generally correlated to the pore diameter d and the number of pores, it is sufficient to determine the relationship between d and $T_{GUR}$ experimentally. Since the pore diameter and the number of pores are correlated to the average particle size and the filling amount of the filler as described later, respectively, it is sufficient to set the particle size and the filling amount of the filler so that the value $X_R$ will be less than 5. Alternatively, for example, $T_{GUR} \times d^2$ may be determined in advance by experimental measurement or the like, and the value of Y may then be set so that the value $X_R$ will be smaller than 5.

The thermoplastic resin used in the porous film of the present invention may be, for example, a polyolefin resin such as a homopolymer of olefin such as ethylene, propylene, butene, or hexene, or a copolymer of two or more kinds of these olefins, or a copolymer of one or more kinds of these olefins and one or more kinds of monomers polymerizable with the olefins; an acrylic resin such as polymethyl acrylate, polymethyl methacrylate, or ethylene-ethyl acrylate copolymer; a styrenic resin such as butadiene-styrene copolymer, acrylonitrile-styrene copolymer, polystyrene, styrene-butadiene-styrene copolymer, styrene-isoprene-styrene copolymer, or styrene-acrylic acid copolymer; a vinyl chloride resin; a vinyl fluoride resin such as polyvinyl fluoride or polyvinylidene fluoride; an amide resin such as 6-nylon, 6,6-nylon, or 12-nylon; a saturated ester resin such as polyethylene terephthalate or polybutylene terephthalate; polycarbonate; polyphenylene oxide; polyacetal; polyphenylene sulfide; a silicone resin; a thermoplastic urethane resin; polyetheretherketone; polyether imide; thermoplastic elastomers of various kinds; cross-linked products of these; or the like.

The porous film of the present invention may contain one or more kinds of thermoplastic resins.

Among the aforesaid thermoplastic resins, a porous film made of a polyolefinic resin is excellent in solvent resistance, and is melted to close pores thereby at a temperature law enough to restrain the abnormal reaction of the cell. Thus, the porous film made of a polyolefin resin may be preferable for using as a separator for a lithium cell.

The olefins used in the present invention may be, for example, ethylene, propylene, butene, hexene, or the like. Specific examples of polyolefins include polyethylenic resins such as low-density polyethylene, linear polyethylene (ethylene-α-olefin copolymer), and high-density polyethylene, polypropylenic resins such as polypropylene and ethylene-propylene copolymer, poly(4-methylpentene-1), poly(butene-1), and ethylene-vinyl acetate copolymer.

In particular, a porous film made of a polyolefinic resin that contains a polyolefin having a molecular chain length of 2850 nm or more has an excellent strength, and can give a cell having a lower internal resistance when used as a separator. The polyolefinic resin preferably contains at least 10 wt %, more preferably at least 20 wt %, still more preferably at least 30 wt %, of polyolefin having a molecular chain length of 2850 nm or more.

The filler to be used in the porous film of the present invention may be either an inorganic filler or an organic filler. Examples of the inorganic fillers include calcium carbonate, magnesium carbonate, barium carbonate, talc, clay, mica, kaolin, silica, hydrotalcite, diatomaceous earth, calcium sulfate, magnesium sulfate, barium sulfate, aluminum hydroxide, magnesium hydroxide, calcium oxide, magnesium oxide, titanium oxide, alumina, zinc oxide, zeolite, and glass powder. Particularly, calcium carbonate, hydrotalcite, barium sulfate, magnesium hydroxide, and alumina are preferable.

The organic filler to be used in the present invention may be selected from a variety of resin particles. Among these, homopolymers of styrene, vinyl ketone, acrylonitrile, methyl methacrylate, ethyl methacrylate, glycidyl methacrylate, glycidyl acrylate, or methyl acrylate, copolymers of two or more kinds of monomers selected from the above group of monomers, and condensation polymers such as melamine and urea may be mentioned.

The average particle size of the aforesaid filler contained in the porous film of the present invention is preferably not more than about 1 $\mu$m, more preferably from about 0.05 to about 1 $\mu$m, still more preferably from about 0.1 to about 0.6 $\mu$m. Typically, the average particle size of the filler contained in the porous film is approximately equal to the average particle size of the filler before blending.

Further, as will be described later, an unstretched film obtained from a thermoplastic resin filled with filler is stretched to generate voids at the interface between the filler and the resin, and then, to create through-hole. Generally, the average pore diameter of the formed pores is approximately equal to the average particle size of the filler that fills the thermoplastic resin.

Further, a porous film containing a filler having an average particle size of not more than about 1 $\mu$m generally has a small average pore diameter d and has a small value of $X_R$.

As a result, the porous film of the present invention can give a cell having a considerably low internal resistance when used as a separator. The average particle size of the filler in the porous film of the present invention is an average of the diameters measured for all the particles found in the field of view having a size of 10 $\mu$m×10 $\mu$m when the porous film surface is observed by a scanning electron microscope (SEM).

The content of the filler in the present invention is preferably at most 85 parts by volume, more preferably at most 70 parts by volume, with respect to 100 parts by volume of the thermoplastic resin in view of the stretchability. Generally, since the number of pores in the porous film is proportional to the filling amount of the filler and the gurley value is correlated to the number of pores, the filling amount is preferably at least 15 parts by volume, more preferably at least 25 parts by volume in view of reducing the value of $X_R$ to be smaller than 5.

Since the porous film of the present invention contains a filler, the porous film has good slip properties, and hence a series of steps of assembling the cell can be smoothly carried out.

The porous film of the present invention may contain additives such as a stretching aid made of aliphatic ester, low-molecular-weight polyolefin resin, or the like, a stabilizer, an antioxidant, an ultraviolet absorber, a fire retardant, and a nonionic surfactant.

The porous film of the present invention can be produced, for example, in the following manner. First, a thermoplastic resin and a filler as well as optional desired additives such as a nonionic surfactant are mixed with the use of a mixing apparatus such as a roll, a Banbury mixer, a monoaxial extruder, or a biaxial extruder to prepare a resin composition from which a film is produced by a film molding method such as inflation processing, calendering processing, or T-die extrusion processing.

For example, a resin composition made of a thermoplastic resin containing at least 10 wt % of polyolefin having a molecular chain length of 2850 nm or more and a filler can be prepared by blending a polyolefin [A] having a weight average molecular chain length of 2850 nm or more and polyolefin wax [B] having a weight average molecular weight of 700 to 6000 in a weight ratio of [A]/[B]=90/10 to 50/50, further adding a predetermined amount of filler, and kneading the mixture with the use of a kneading apparatus having, in a barrel, a screw constituted by a combination of at least two kinds of segments, i.e. a full flight screw and a kneading block so as to enable strong kneading. Particularly, it is preferable to use a kneading apparatus having a ratio L/D of at least 30, a ratio $L_f$/D of at least 3, and a ratio $L_n$/D of at least 5, where L (mm), D(mm), $L_f$(mm), and $L_n$(mm) represent the total length of the screw, the inner diameter of the barrel, the combined length of the full flight screws, and the combined length of the kneading blocks, respectively.

Further, it is preferable to use an apparatus having a value α within the range from 35 to 60, a ratio M/D within the range from 0.15 to 0.25, where α (°) and M (mm) represent the flight angle of the full flight screw and the depth of the screw groove of the full flight screw, respectively.

Here, in the present invention, the molecular chain length, the weight average molecular chain length, the molecular weight, and the weight average molecular weight of the polyolefin were measured by GPC (gel permeation chromatography), and the mixing ratio (wt %) of the polyolefins within a specific molecular chain length range or within a specific molecular weight range can be determined by integration of the molecular weight distribution curve obtained by the GPC measurement.

The molecular chain length of the polyolefin is the molecular chain length measured by GPC (gel permeation chromatography) as converted in terms of polystyrene and is, more specifically, a parameter determined according to the following procedure.

Namely, as the moving phase in the GPC measurement, one makes use of a solvent that can dissolve both a sample to be measured its molecular weight and a standard polystyrene having a known molecular weight. First, GPC measurement is carried out on plural kinds of standard polystyrene having different molecular weights to determine the each holding time of plural kinds of standard polystyrene. With the use of a Q factor of polystyrene, the each molecular chain length of standard polystyrene is determined and, from this, the each molecular chain length of standard polystyrene and the holding time corresponding thereto are found out. Here, the molecular weight, the molecular chain length, and the Q factor of standard polystyrene are under the following relationship:

molecular weight=molecular chain length×$Q$ factor.

Next, GPC measurement is carried out on a sample to obtain a holding time—eluted component amount curve. Assuming that the molecular chain length of standard polystyrene having a holding time of T in the GPC measurement of standard polystyrene is L, the "molecular chain length as converted in terms of polystyrene" of a component having a holding time of T in the GPC measurement of a sample is defined as L. With the use of this relationship, the molecular chain length distribution, as converted in terms of polystyrene, of the sample (the relationship between the molecular chain length as converted in terms of polystyrene and the eluted component amount) is determined from the aforesaid holding time eluted component amount curve of the sample.

Next, this film is stretched to form pores at the interface between the filler and the resin. The stretching is carried out in a monoaxial direction or in biaxial directions with the use of a roll stretcher, a tenter stretcher, or the like.

The stretching temperature is preferably lower than or equal to the melting point or the softening point of the thermoplastic resin.

For example, if the thermoplastic resin is a polyolefin resin, the stretching temperature is preferably lower than or equal to the melting point of the polyolefin resin, and particularly the range from 50 to 150° C. is preferable. The stretching ratio is preferably about 2 (twofold) to about 10 (tenfold), more preferably about 3 (threefold) to about 8 (eightfold). If the stretching ratio is less than about 2, the pores of the film are less likely to be suitably enlarged and a porous film thus obtained may have a parameter $X_R$ more than 5. On the other hand, if the stretching ratio exceeds about 10, the thickness of the film thus obtained may be uneven and liable to be broken during the stretching.

The thermoplastic resin constituting the porous film of the present invention may be cross-linked by radiation of radioactive rays. A porous film made of a cross-linked thermoplastic resin is more excellent in heat resistance and strength than a porous film made of a non-cross-linked thermoplastic resin.

In view of acheiving an excellent ion conductivity when a porous film is used as an ion transmission film, the porous film of the present invention may preferably has a thickness of about 3 to about 50 $\mu$m. In this case, the thermoplastic resin constituting the porous film is more preferably cross-linked by radioactive radiation. Generally, when the thickness of a porous film is reduced, there is a problem of decrease in the film strength. In contrast, the porous film of the present invention having a thickness of about 3 to 50 $\mu$m and made of a thermoplastic resin that is cross-linked by radiation of radioactive rays can be an ion transmission film being excellent in ion conductivity and having a high strength.

The porous film of the present invention made of a cross-linked thermoplastic resin can be obtained by radiation of radioactive rays on a porous film of the present invention that is produced with the use of a non-cross-linked thermoplastic resin.

The type of radioactive rays to be radiated on the porous film of the present invention for cross-linking is not particularly limited; however, gamma rays, alpha rays, electron beams and others are preferably used, and in particular, electron beams are more preferable in view of production speed and safety.

The radiation source to be used is preferably an electron beam accelerator having an acceleration voltage of 100 to 3000 kV. If the acceleration voltage is lower than 100 kV, the transmission depth of the electron beams may be insufficient, whereas if the acceleration voltage is higher than 3000 kV, the apparatus may be extensive and not preferable in view of costs. Examples of the radioactive ray radiation apparatus include electron beam scanning type apparatus such as a Van de Graaff type and electron-beam-fixed conveyor-moving type apparatus such as an electron curtain type.

The amount of radioactive rays to be absorbed is preferably 0.1 to 100 Mrad, more preferably 0.5 to 50 Mrad. If the amount of absorbed rays is smaller than 0.1 Mrad, the effect of cross-linking the resin may be insufficient, whereas if the amount of absorbed rays is larger than 100 Mrad, the strength is considerably reduced, so that it is not preferable.

Radiating radioactive rays onto the porous film of the present invention may be conducted under air or inert gas such as nitrogen, and preferably under inert gas.

Also, in radiating radioactive rays, the porous film of the present invention may be impregnated with another monomer compound or polymer, and the radioactive rays may be radiated to carry out reaction for cross-linking or graft polymerization. Examples of the compounds with which the porous film of the present invention is mixed or impregnated include styrene, divinyl benzene, acrylic acid, acrylic ester, methacrylic acid, methacrylic ester, fluorine compounds, homopolymers and copolymers of these, and sulfonic acid derivatives and phosphoric acid ester derivatives of the above-mentioned monomers or polymers.

The above-mentioned porous film of the present invention can be suitably used as a separator in a cell. Therefore, the separator for a cell according to the present invention is characterized by being made of the aforesaid porous film of the present invention, and the cell of the present invention is characterized by having a separator made of the aforesaid porous film of the present invention. Examples of cells to be used in the present invention include lithium primary cells, lithium secondary cells, nickel-hydrogen cells, and alkali-manganese cells.

For example, if the cell of the present invention is a lithium secondary cell, the negative electrode may be made of lithium metal, an alloy of lithium and aluminum or the like, or a carbon electrode formed to be capable of absorbing and desorbing lithium ions, and the positive electrode may be made of a known electrode such as manganese dioxide. The form of the cell may be as follows. For example, the porous film of the present invention (i.e. the separator) may be rolled up between the positive electrode and the negative electrode, or alternatively each electrode may be wrapped up with a bag made of the porous film of the present invention. The obtained product is then inserted into a case together with an electrolytic solution and sealed to obtain a cell. The electrolytic solution to be used in the present invention may be, for example, a non-aqueous solution obtained by dissolving an electrolyte such as $LiPF_6$ into a non-protonic polar solvent such as ethylene carbonate (EC), ethyl methyl carbonate, or dimethyl carbonate (DMC).

EXAMPLES

Hereafter, the present invention will be described more specifically with reference to the Examples thereof; however, the present invention is not limited to these Examples alone.

Here, the physical properties of the porous films in the Examples and the Comparative Example were measured by the following method.

Gurley value: the gurley value $T_{GUR}$ (sec/100 cc) of a porous film was measured by means of B-type Densometer (manufactured by Toyo Seiki Seisakusho Co., Ltd.) according to JIS P8117.

Average pore diameter: the average pore diameter d ($\mu$m) of a porous film was measured by means of Perm-Porometer (manufactured by PMI Co., Ltd.) according to the bubble point method (ASTM F316-86).

Average particle size: the average particle size Y ($\mu$m) of a filler in a porous film was measured by averaging the diameters measured for all the particles found in the field of view having a size of 10 $\mu$m×10 $\mu$m when the porous film surface was observed by a scanning electron microscope (S2360N type, Hitachi Scanning Electron Microscope).

Internal resistance evaluation (loading characteristics evaluation): in order to evaluate the internal resistance, an electrode and a flat-plate type test cell for testing of charging/discharging were prepared by the following method.

An N-methylpyrrolidone solution containing polyvinylidene fluoride corresponding to 5 wt % was added to a mixture of 89 wt % of lithium cobaltate powder, 1 wt % of acetylene black, and 5 wt % of scale-like artificial graphite, and the resultant was sufficiently kneaded to prepare a paste. The paste was applied onto an aluminum foil having a thickness of 20 $\mu$m as a collector, followed by drying and roll pressing to prepare a positive electrode sheet.

The positive electrode sheet thus prepared and metal lithium as a negative electrode were laminated via a separator made of a porous film. To this was added an electrolytic solution obtained by dissolving $LiPF_6$ into a mixed solvent containing ethylene carbonate, ethyl methyl carbonate, and dimethyl carbonate in a volume ratio of 30:35:35 so that $LiPF_6$ would be contained at 1 mol/liter, thereby to prepare a flat-plate type test cell.

On the flat-plate type test cell thus obtained, a charging/discharging test by charging at a constant current and constant voltage and discharging at a constant current was carried out under the following conditions to measure the discharging capacity, and the loading characteristics were evaluated on the basis of the obtained results.

Charging/discharging A was carried out at maximum charging voltage of 4.3 V, charging period of 8 hours, charging current of 0.5 mA/cm$^2$, minimum discharging voltage of 3.0 V, and discharging current of 0.5 mA/cm$^2$.

Charging/discharging B was carried out at maximum charging voltage of 4.3 V, charging period of 8 hours, charging current of 0.5 mA/cm$^2$, minimum discharging voltage of 3.0 V, and discharging current of 6.7 mA/cm$^2$.

Charging/discharging C was carried out at maximum charging voltage of 4.3 V, charging period of 8 hours, charging current of 0.5 mA/cm$^2$, minimum discharging voltage of 3.0 V, and discharging current of 10 mA/cm$^2$.

Charging/discharging D was carried out at maximum charging voltage of 4.3 V, charging period of 8 hours, charging current of 0.5 mA/cm$^2$, minimum discharging voltage of 3.0 V, and discharging current of 16.7 mA/cm$^2$.

The loading characteristics I are defined as (discharging capacity of charging/discharging B)/(discharging capacity of charging/discharging A).

The loading characteristics II are defined as (discharging capacity of charging/discharging C)/(discharging capacity of charging/discharging A).

The loading characteristics III are defined as (discharging capacity of charging/discharging D)/(discharging capacity of charging/discharging A).

Here, the loading characteristics are a ratio of the electric capacity that can be taken out when a large electric current (corresponding to the above charging/discharging B to D) is passed, to the electric capacity that can be taken out when a minute electric current (corresponding to the above charging/discharging A) is passed. According as the internal resistance of the cell decreases, the loading characteristics show a larger value. When the internal resistance is zero, the loading characteristics are 100%. The loading characteristics are an important property in a secondary cell such as a lithium ion cell.

Example 1

After 35 parts by volume of hydrotalcite (DHT-4A manufactured by Kyowa Chemical Co., Ltd.) and 65 parts by volume of polypropylene resin (FS2011D manufactured by Sumitomo Chemical Industry Co., Ltd.) were kneaded by means of a biaxial kneader (L/D=60) manufactured by Plastics Engineering Institute, the kneaded product was extruded from a T-die to prepare an unstretched film having a thickness of about 60 $\mu$m.

The obtained unstretched film was stretched to about 4 times (fourfold) at a stretching temperature of 130° C. by means of a tenter stretcher to give a porous film having a thickness of 34 $\mu$m. The hydrotalcite in the obtained porous film had an average particle size of 0.5 $\mu$m. The air permeability and the average pore diameter of this porous film were measured. Further, a cell having a separator made of this porous film was fabricated for carrying out an evaluation of its internal resistance (loading characteristic evaluation). The results are shown in Table 1 and Table 2.

Example 2

The same unstretched film as in Example 1 was prepared and stretched to about five times (fivefold) at a stretching temperature of 100° C. by means of a roll stretcher to give a porous film having a thickness of 30 μm. The hydrotalcite in the obtained porous film had an average particle size of 0.5 μm. The air permeability and the average pore diameter of this porous film were measured. Further, a cell having a separator made of this porous film was fabricated for carrying out an evaluation of its internal resistance (loading characteristic evaluation). The results are shown in Table 1 and Table 2.

Example 3

After 30 parts by volume of hydrotalcite (DHT-4A manufactured by Kyowa Chemical Co., Ltd.) and 70 parts by volume of mixed polypropylene resin containing 70 wt % of ultra-high-molecular-weight polyethylene and 30 wt % of polyethylene wax were kneaded by means of a biaxial kneader (L/D=60) manufactured by Plastics Engineering Institute, the kneaded product was molded by means of a bench presser to form an unstretched film having a thickness of about 60 μm.

The obtained unstretched film was stretched to about 6 times (sixfold) at a stretching temperature of 100° C. by means of an autograph to give a porous film having a thickness of 25 μm. The hydrotalcite in the obtained porous film had an average particle size of 0.5 μm. The air permeability and the average pore diameter of this porous film were measured. Further, a cell having a separator made of this porous film was fabricated for carrying out an evaluation of its internal resistance (loading characteristic evaluation). The results are shown in Table 1 and Table 2.

Comparative Example 1

After 30 parts by volume of polymethyl methacrylate beads (Epostar MA1001 manufactured by Nippon Catalyst Co., Ltd.) and 70 parts by volume of polypropylene resin (FS2011D manufactured by Sumitomo Chemical Industry Co., Ltd.) were kneaded by means of a biaxial kneader (L/D=60) manufactured by Plastics Engineering Institute, the kneaded product was extruded from a T-die to prepare an unstretched film having a thickness of about 100 μm. The obtained raw fabric film was stretched to about 6 times (sixfold) at a stretching temperature of 120° C. by means of a roll stretcher to give a porous film having a thickness of 25 μm. The polymethyl methacrylate beads in the obtained porous film had an average particle size of 1.5 μm. The air permeability and the average pore diameter of this porous film were measured. Further, a cell having a separator made of this porous film was fabricated for carrying out an evaluation of its internal resistance (loading characteristic evaluation). The results are shown in Table 1 and Table 2.

TABLE 1

|  | $T_{GUR}$ (sec/100 cc) | d (μm) | Y (μm) | $X_R$ |
|---|---|---|---|---|
| Example 1 | 260 | 0.08 | 34 | 1.2 |
| Example 2 | 320 | 0.07 | 30 | 1.3 |
| Example 3 | 90 | 0.1 | 25 | 0.9 |
| Comparative Example 1 | 100 | 0.5 | 25 | 25 |

TABLE 2

|  | Discharging capacity | | | | Loading characteristics (%) | | |
|---|---|---|---|---|---|---|---|
|  | Charging/discharging A | Charging/discharging B | Charging/discharging C | Charging/discharging D | I | II | III |
| Example 1 | 156 | 145 | 128 | 57 | 93 | 82 | 36 |
| Example 2 | 156 | 140 | 104 | 31 | 90 | 67 | 20 |
| Example 3 | 156 | 136 | 120 | 22 | 87 | 77 | 14 |
| Comparative Example 1 | 156 | 8 | — | — | 5 | — | — |

The symbol "—" appearing in the charging/discharging capacity and the loading characteristics of the Tables shows that the evaluation was impossible because of the internal resistance being too high.

As will be apparent from the above Examples, the porous thermoplastic resin film of the present invention can reduce the internal resistance of a cell when used as a separator of the cell.

What is claimed is:

1. A porous film comprising a thermoplastic resin and a filler, wherein $X_R$ defined by the following formula:

$$X_R = 25 \times T_{GUR} \times d^2/Y$$

is less than 5, where Y (μm), $T_{GUR}$ (sec/100 cc), and d (μm) represent the thickness, the gurley value, and the average pore diameter of said film, respectively.

2. The porous film according to claim 1, wherein said filler has an average particle size of not more than about 1 μm.

3. The porous film according to claim 1, wherein said thermoplastic resin is a polyolefin resin.

4. The porous film according to claim 3, wherein said polyolefinic resin contains at least 10 wt % of polyolefin having a molecular chain length of at least 2850 nm.

5. The porous film according to claim 1, wherein $X_R$ is not more than 3.

6. The porous film according to claim 1, wherein $X_R$ is not more than 2.

7. A separator for a cell, wherein said separator comprises a porous film according to claim 1.

8. A cell having a separator that comprises a porous film according to claim 1.

* * * * *